Aug. 17, 1965 KOSUKE MATSUKATA 3,201,133

RECORD CHANGER DIAMETER ADAPTER

Filed July 23, 1962 2 Sheets-Sheet 1

INVENTOR,
Kosuke Matsukata

BY Wenderoth, Lind & Ponack,
ATTORNEYS

Aug. 17, 1965 KOSUKE MATSUKATA 3,201,133

RECORD CHANGER DIAMETER ADAPTER

Filed July 23, 1962 2 Sheets-Sheet 2

INVENTOR,
Kosuke Matsukata

BY Wenderoth, Lind & Ponack

ATTORNEYS

United States Patent Office 3,201,133
Patented Aug. 17, 1965

3,201,133
RECORD CHANGER DIAMETER ADAPTER

Kosuke Matsukata, 390 Tsurumi-cho, Tsurumi-ku, Yokohama, Japan
Filed July 23, 1962, Ser. No. 211,785
Claims priority, application Japan, May 7, 1962, 40/27,030
3 Claims. (Cl. 274—42)

This invention relates to a phonographic record changer adapter and holder.

Hitherto record changers have been set up for records of standard sizes such as 12, 10 and 7 inches (or 30, 25 and 17.5 centimeters) in diameter.

Modern record changers can handle a series of records having different diameters. This is made possible by having a feeler which moves to determine the size of the record ready for playing by touching the outer edge of the record prior to placing of the record on the turntable. The operation of the feeler is coordinated with that of the principal mechanism of the changer which can only handle predetermined sizes of from one to three diameters such as described above. After the feeler has sensed the diameter of the record, the record is dropped onto the turntable and a tone arm with a sound stylus moves so as to be dropped at a predetermined distance from the outer edge of the record.

According to this invention, most of these conditions to which a modern record changer must be adapted can be eliminated and the whole mechanism can be simplified by restricting the diameter of record to be manipulated to a single diameter, thus resulting in easy maintenance and low cost of manufacture of a record changer.

With the recent introduction into the market of thin film sheet records having a thickness ranging from 0.1 mm. to 0.4 mm., record sizes which have been hitherto restricted to three conventional sizes has given away to a more liberal diameter system. For example, there are now on the market considerable numbers of film sheet records having diameters of 20 cm. and 18.5 cm.

Further difficulty can easily be anticipated during the playing of thin film sheet records by themselves on a record player due to lack of rigidity of the sheet body. To overcome these difficulties the adapter and holder of this invention can be used. According to this invention a record changer is no longer required either to be restricted to handling of predetermined diameters or to have the tone arm dropped at a specified distance from the edge, except for the maximum size of record which is to be played. The maximum diameter of record to be played is the only element to which the mechanism is adapted.

It is the object of this invention to provide a record holder and adapter which permits the mechanism of a record changer to be simplified in that the maximum diameter of record to be played is all that need be established, and thus the cost of manufacture and maintenance are reduced and conventional as well as thin film sheet records can be played with the use of a single diameter type mechanism and a mixture of records of different sizes and types can be played.

The above and other objects of this invention will appear from the following description of several embodiments thereof, reference being had to the accompanying drawings in which.

Figure 1:
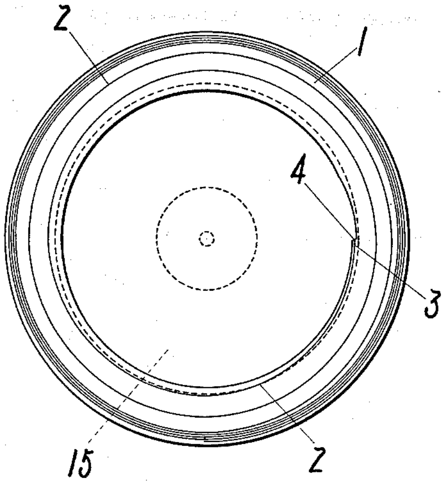
FIGURE 1 is a plan view of the adapter of the present invention.
Figure 3:
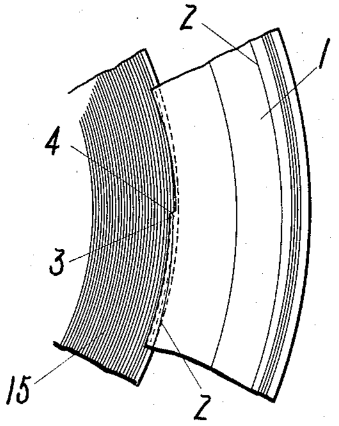
FIGURE 3 is enlarged view of a part of the adapter showing the end of a guide track and its relationship with the sound track of the film sheet record or conventional record as positioned in the adapter and holder.

Referring now to FIGURES 1 through 8, they illustrate an adapter and holder which are particularly useful for thin film sheet records. In FIGURE 1, a thin film sheet record is shown in dotted lines. The adapter 1 has an outside diameter which corresponds to the maximum diameter (30 cm. or 25 cm.) fixed for the specified changer. A spiral guide groove 2 starts at a conventional distance from the edge. The pitch of the groove 12 can be large as compared with the sound track of an ordinary record as shown until it terminates at 3 at the substantially radially extending portion 4. This shortens the time required for the needle to reach the sound track of the film sheet record. FIGURE 3 shows a view which is a part of FIGURE 1 especially at substantially radially extending portion 4.

The end 3 of the guide groove on the adapter 1 meets the regular sound track on the film sheet record underneath at an acute angle so that a stylus leaves the adapter without being disturbed by the radially extending portion 4 and the portion of the adapter which is cut away for some distance as shown in the FIGURE 3 to leave a spiral inside edge on the adapter. After the sound stylus lands on the film sheet record, it proceeds along the sound track of the same. The width of the adapter is such as to be sufficient to cover first two or three grooves of the sound track on the film sheet record. The adapter is made of soft plastic material such as vinyl chloride sheet having a thickness ranging from 0.3 to 0.6 mm.

Figure 2:
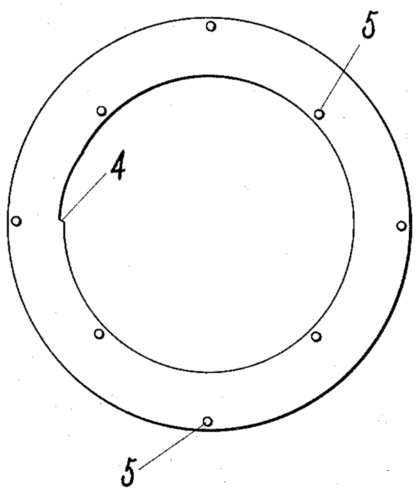
FIGURE 2 is a bottom view thereof.
Figure 4:
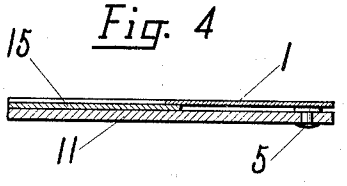
FIGURE 4 is sectional view of FIGURE 3 and showing the adapter assembled with the holder.
Figure 5:
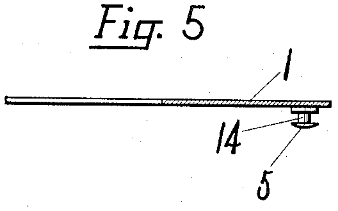
FIGURE 5 shows a part of the adapter in section.

FIGURE 2 shows back side of the adapter which has securing means in the form of headed members 5 thereon. Members 5 are better seen in FIGURE 5 which is sectional view of a part of the adapter itself. This member 5 is attached to the back side of the adapter and has a stem 14, which fits into an aperture in the holder 11 of FIGURE 4. FIGURE 4 is a sectional view of the assembled adapter 1, holder 11 and film sheet record 15 in their respective positions.

Figure 8:
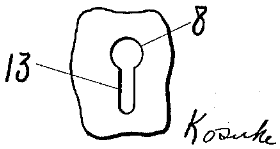
FIGURE 8 is a fragmentary view showing a receiving hole in the record holder.
Figure 6:
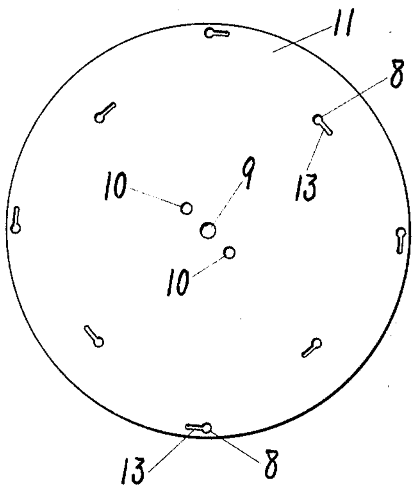
FIGURE 6 is a plan view of the holder for the record.
Figure 7:
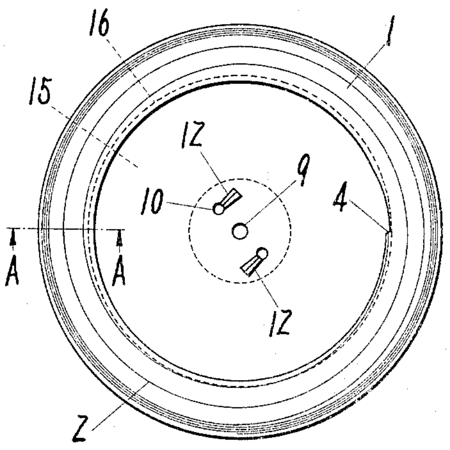
FIGURE 7 is a plan view of the adapter and holder in the assembled condition.

FIGURE 6 shows the holder 11 which has several holes, shown clearly in FIG. 8, to receive members 5. The head of member 5 is first pushed into round section 8 of the hole and then the adapter 1 is rotated so that stem 14 of member 5 fits into the elongated narrow section 13 of the hole. Stem 14 is made of somewhat elastic material which is able to hold the adapter 1 tightly with a film sheet record between it and the record holder 11. Small holes 10 are provided near the center spindle hole 9 to engage auxiliary engaging means 12 on the holder 11 in case the film sheet record is inclined to warp at the center. Corresponding holes are made in film sheet record and adhesive cellophane tapes with the adhesive side held outwardly are led through these holes and flattened out on both sides and fixed to the holder and the record to serve as the auxiliary engaging means 12. This procedure can be easily completed without much labor and expense for abnormal cases and the cellophane tapes can be easily removed after playing. The material of holder 11 can be plastic material of any kind which may be used for a conventional record.

Figure 9:
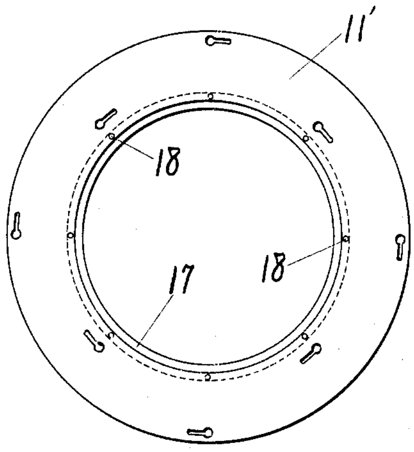
FIGURE 9 is a plan view of a modified form of holder for a conventional rigid record.
Figure 10:
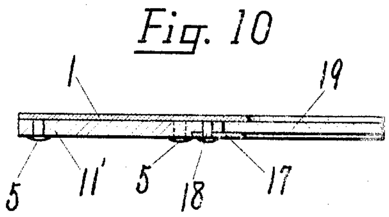
FIGURE 10 is a partial sectional view of an assembled adapter and holder with a conventional record held therein.
Figure 11:
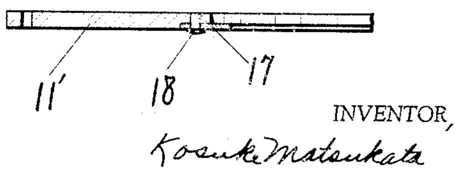
FIGURE 11 is sectional view of a part of the holder by itself.

FIGURE 9 shows a modified holder 11' for use with a conventional record the diameter of which is smaller than the predetermined diameter selected for the record changer. A narrow metal ring 17 is riveted by rivets 18 or glued to holder 11' to keep the edge of the conventional record in its place within the adapter 1. FIGURE 10 shows an assembly of a conventional relatively rigid record 19 and the adapter 1 and holder 11' in their respective positions. FIGURE 11 shows sectional view of holder 11' showing the narrow metal ring 17 riveted by rivets 18.

As already explained, the assembly of the combination of the adapter and holder with a record therein is simple. Merely rotating the adapter fixes it tightly to the holder with a film sheet record or a conventional record held therein and the assembly is ready to be played on a record player. A film sheet record or a conventional record of a size smaller than the predetermined diameter selected for the record changer can be mixed and played with ease if a sufficient number of adapters and holder are available.

Although specific embodiments of the invention have been illustrated and described herein, it will be understood that other structural arrangements and designs might be employed without departing from the spirit of the invention.

The embodiments of this invention in which an exclusive property or privilege is claimed are defined as follows.

I claim:

1. In combination, a phonograph record and a device holding the phonograph record, comprising a record adapter having an annular shape the outside diameter of which is greater than the record which is held and the inside diameter is slightly less than the outside diameter of the record, the adapter being placed over the record concentrically therewith, the inside edge of the annular adapter overlapping the outer edge of the record around the entire periphery thereof, the inside edge of the annular adapter being spiral in shape and having a substantially radially extending portion of a length such that it traverses only a few grooves in the record, said adapter having a spiral groove in the surface thereof which curves inwardly from the outer edge thereof to the said radially outwardly extending portion, and a record holder having an outside diameter substantially the same as the outside diameter of said adapter and supporting at least the peripheral portion of the surface of the record, and means detachably securing the adapter to the record holder with the record between the adapter and the record holder.

2. A combination as claimed in claim 1 in which said record holder is a flat circular disc, and said detachable securing means have spacer means forming a part thereof substantially equal to the thickness of the record which is held.

3. A combination as claimed in claim 1 in which said record holder is an annular member having an inside diameter substantially equal to the outside diameter of the record, and having a retaining ring having an inside diameter less than the outside diameter of the record and detachably secured to the side of said record holder opposite the side on which said adapter is positioned, the adapter being secured against the record holder so that the record is held within the annular record holder between the retaining ring and the inner edge of the adapter.

References Cited by the Examiner

UNITED STATES PATENTS

| | | | |
|---|---|---|---|
| Re. 14,892 | 6/20 | Lecoutre | 24—222 |
| 1,112,406 | 9/14 | Ebeling | 274—42 |
| 1,683,469 | 9/28 | Kauffman | 274—42 |
| 2,318,654 | 5/43 | Wissner | 274—42 |
| 2,600,573 | 6/52 | Rabkin | 274—42 |
| 2,646,284 | 7/53 | Weingarden | 274—42 |

FOREIGN PATENTS

| | | |
|---|---|---|
| 1,240,944 | 8/60 | France. |

NORTON ANSHER, *Primary Examiner.*

EMIL G. ANDERSON, *Examiner.*